United States Patent [19]

Schilling et al.

[11] Patent Number: 4,859,245
[45] Date of Patent: Aug. 22, 1989

[54] VISCOSIFIERS FOR ASPHALT EMULSIONS

[75] Inventors: Peter Schilling; Hans G. Schreuders, both of Charleston, S.C.

[73] Assignee: Westvaco Corporation, New York, N.Y.

[21] Appl. No.: 153,220

[22] Filed: Feb. 8, 1988

Related U.S. Application Data

[63] Continuation-in-part of Ser. No. 891,593, Aug. 1, 1986, abandoned.

[51] Int. Cl.$^4$ ............................................. C08L 95/00
[52] U.S. Cl. .................................. 106/277; 106/284.4; 106/284.06; 252/311.5
[58] Field of Search ................ 106/277, 273 N, 284.4, 106/284.06; 252/311.5

[56] References Cited

U.S. PATENT DOCUMENTS

| | | | |
|---|---|---|---|
| 4,447,269 | 5/1984 | Schreuders et al. | 106/277 |
| 4,464,286 | 8/1984 | Schilling | 106/277 |
| 4,494,992 | 1/1985 | Schilling et al. | 106/277 |

OTHER PUBLICATIONS

Derwent Abstract Accession No. 86-002077/01, Hungarian Patent No. 35706, Jul. 29, 1985.

Primary Examiner—Amelia Burgess Yarbrough
Attorney, Agent, or Firm—Terry B. McDaniel; Richard L. Schmalz

[57] ABSTRACT

Bituminous emulsion viscosifiers are disclosed to be prepared by condensation of the residue obtained from the distillation of crude tall oil or tall oil derived fatty acids and resin acids (rosin) with various amines, which when added to the asphalt before emulsification produce emulsions of a higher viscosity than the emulsion prepared with the asphalt without the additive, at the same or reduced bitumen content.

16 Claims, No Drawings

VISCOSIFIERS FOR ASPHALT EMULSIONS

This is a continuation-in-part of co-pending application Ser. No. 891,593, filed on Aug. 1, 1986, now abandoned.

BACKGROUND OF THE INVENTION

1. Field of the Invention

This invention relates to improved bituminous emulsions, specifically bituminous emulsions of improved viscosity. The invention relates to a method of adding certain nitrogen containing compounds to the bitumen before emulsification with anionic or cationic emulsifiers to provide emulsions of improved viscosity. The nitrogen containing compounds are reaction products of a greater molar amount of tall oil fatty acids, rosin, tall oil pitch, petroleum derived acids or esters, vegetable oils, animal oils, tallow fatty acids or any distillation residue which contains carboxylic acid groups reacted with a lesser molar amount of ammonia or amines (to form amides), polyalkylene amines (to form polyamides or imidazoline amides), alkanolamines (to form acid esters), or trialkanolamines (to form aminoesters).

2. Description of the Prior Art

In road construction two major technolgies are now applied to build or repair asphalt wearing courses. One option is to mix fluidized asphalt with dry aggregate and distribute the coated stones evenly on the roadbase or the old surface to be repaired. Smoothing out and compaction is done by rolling the mixes with a pneumatic roller. The other option is to use asphalt in water emulsions. There are several methods of application of emulsifiers which are distinguished by set time or the time it takes for the evaporation of the water at ambient conditions and by the type of the emulsifier used for its production.

Properties of an asphalt emulsion depend greatly upon the chemical used as the emulsifier. That chemical is a surface-active agent, commonly called surfactant, that determines whether the emulsion will be classified as anionic, cationic, or nonionic. The emulsifier also keeps the asphalt droplets in stable suspension and permits breaking at the proper time. The surfactant changes the surface tension at the interface, i.e., the area of contact between the asphalt droplets and the water.

Several chemical emulsifiers are commercially available. The most often used anionic emulsifiers are fatty acids, which are wood-product derivatives such as tall oils, rosins, and lignins. Anionic emulsifiers are saponified (turned into soap) by reacting with sodium hydroxide or potassium hydroxide. Of course, in order to emulsify the oil-based bitumen in water, the emulsifier must be water-soluble.

Most cationic emulsifiers are fatty amines (diamines, imidazolines, amidoamines, to name three). The amines are converted into water-soluble soap by reacting with acid, usually hydrochloric. Another type of emulsifying agent, fatty quaternary ammonium salts, is used to produce cationic emulsions. They are water-soluble salts as produced and do not require the addition of acid to make them water-soluble. They are stable, effective cationic (positively charged) emulsifiers.

Emulsifiers for bituminous emulsions are disclosed in U.S. Pat. Nos. 4,478,642 and 4,494,992 to Schilling et al. These modified reaction products of polyamines with certain polycarboxylic acids and sulfonated carboxylic acids are formed by reacting a greater molar amount of polyamine to a lesser molar amount of the fatty acid and subsequently modifying the reaction product with a variety of reagents taught by the patentees. Also, Schilling, in U.S. Pat. No. 4,547,224, teaches the reaction products of a greater molar amount of polyamines and a lesser molar amount of certain polycarboxylic acid anhydrides as emulsifiers for bituminous emulsions. All of these known emulsifiers, naturally, are water-soluble and exhibit relatively high amine values due to the high content of amine groups in the condensate.

The pH value of the asphalt emulsion is unrelated to its identification as cationic or anionic. Acidity or alkalinity does not determine the sign of the charge. This sign is determined only by the type of emulsifier.

Each emulsifier manufacturer has his own procedure for using his agent in asphalt emulsion production. In most cases, the emulsifier is combined with water before introduction into the colloid mill. In other cases, however, it may be combined with the asphalt cement just before it goes into the colloid mill.

Asphalt is the basic ingredient of the emulsion and, in most cases, it makes up from 55 to 70 percent. The asphalt content is specified for various types of emulsions in ASTM D977 and D2397 which specifications are incorporated by reference herein.

There is not an exact correlation, however, between the properties and the case with which the asphalt can be emulsified. Although hardness of base asphalt cements may be varied as desired, most emulsions are made with asphalts in the 50–250 penetration range. Compatibility of the emulsifying agent with the asphalt cement is essential for production of a stable emulsion.

Asphalt is a colloid composed of several fractions, the major ones being asphaltenes and maltenes. The colloidal make-up of the asphalt depends on the chemical nature and percentage of these fractions and their relationship to each other.

The asphaltenes are the dispersed phase in the alphalt whereas the maltenes are the continuous phase. The asphaltenes are thought to furnish hardness while the maltenes are believed to provide the adhesive and ductile properties of the asphalt. The maltenes present have an influence on the viscosity, or flow properties of the asphalt. The complex interaction of the different fractions make it almost impossible to predict accurately the behavior of an asphalt to be emulsified. For this reason, constant quality control is maintained on emulsion production to detect and correct any tendency of the asphalt to affect adversely the performance of the resulting emulsion.

In the general method of emulsifying asphalts, concurrent streams of molten asphalt cement and treated water are directed by positive displacement pumps into the intake of the colloid mill. The asphalt and emulsifying water are subjected to intense shear stresses as they pass through the colloid mill. The newly formed emulsion may then be pumped through a heat exchanger. The excess heat is used to raise the temperature of incoming emulsifying water just before it reaches the colloid mill. From the heat exchanger, the emulsion is pumped into bulk storage tanks. These tanks sometimes are quipped with some type of stirring device to keep the product uniformly blended.

Heated asphalt cement, the base of the asphalt emulsion, is fed into the colloid mill where it is divided into tiny droplets. At the same time, water containing the emulsifying agent is fed into the colloid mill. The asphalt, as it enters the colloid mill, is heated to ensure a low viscosity, and the water temperature is adjusted accordingly.

As mentioned, asphalt emulsions are divided into three categories: anionic, cationic, and nonionic. In practice, the first two types are ordinarily used in roadway construction and maintenance. Nonionics, however, may be more widely used as emulsion technology advances. The anionic and cationic classes refer to the electrical charges surrounding the asphalt particles. This identification system stems from one of the basic laws of electricity—like charges repel one another and unlike charges attract. When two poles (an anode and a cathode) are immersed in a liquid and an electric current is passed through, the anode becomes positively charged and the cathode becomes negatively charged. If a current is passed through an emulsion containing negatively charged particles of asphalt, they will migrate to the anode. Hence, the emulsion is referred to as anionic. Conversely, positively charged asphalt particles will move to the cathode and the emulsion is known as cationic. With nonionic emulsions, the asphalt particles are neutral and, therefore, do not migrate to either pole.

Emulsions are further classified on the basis of how quickly the asphalt will coalesce; i.e., revert to asphalt cement. The terms RS, MS, and SS have been adopted to simplify and standardized this classification. They are relative terms only and mean rapid-setting, medium-setting and slow-setting. The tendency to coalesce is closely related to the mixing of an emulsion. An RS emulsion has little or no ability to mix with an aggregate, an MS emulsion is expected to mix with coarse but not fine aggregate, and an SS emulsion is designed to mix with fine aggregate.

The emulsions are further subdivided by a series of numbers related to viscosity of the emulsions and hardness of the base asphalt cements. The letter "C" in front of the emulsion type denotes cationic. The absence of the "C" denotes anionic or nonionic. For example, RS-1 is anionic or nonionic and CRS-1 is cationic.

Three grades of high-float, medium-setting anionic emulsions, designated HFMS, have been added to standard ASTM specifications. These grades are used primarily in cold and hot plant mixes, coarse aggregate seal coats, and road mixes. High float emulsions have a specific quality that permits a thicker film coating without danger of runoff.

A quick-set type of emulsion (QS) has been developed for slurry seals. Its use is rapidly increasing as the unique quick-setting property solves one of the major problems associated with the use of slurry seals.

The physical properties of the asphalt emulsions are specified by AASHTO and ASTM (D977 and D2397), which references are incorporated by reference herein. One of the main specifications of the emulsion grades set forth in Table I is minimum and maximum viscosity and the minimum asphalt content.

TABLE I

| Emulsified Asphalt | Cationic Emulsified Asphalt |
| --- | --- |
| RS-1 | CRS-1 |
| RS-2 | CRS-2 |
| MS-1 | — |
| MS-2 | CMS-2 |
| MS-2h | CMS-2h |
| HFMS-1 | — |
| HFMS-2 | — |

TABLE I-continued

| Emulsified Asphalt | Cationic Emulsified Asphalt |
| --- | --- |
| HFMS-2h | — |
| SS-1 | CSS-1 |
| SS-1h | CSS-1h |

The "h" that follows certain grades simply means that a harder base asphalt is used. The "HF" preceding some of the MS grades indicates high-float, as measured by the Float Test (AASHTO T 50 or ASTM D 139). High-float emulsions have a quality, imparted by the addition of certain chemicals, that permits a thicker asphalt film on the aggregate particles with minimum probability of drainage. Some user agencies specify an additional cationic sandmixing grade designated CMS-2s, which contains more solvent than other cationic grades.

Asphalt emulsion viscosities are primarily dependent on the amount of asphalt in the emulsion. Other factors include the dosage and type of the asphalt emulsifiers, the pH values of the emulsion, the particle size of the emulsified droplets, the manufacturing condition (temperature, shear, and pressure), the type of colloid mill, the addition of chemical modifiers, the chemical properties of the various components, and the hardness of the base asphalt cement.

The properties of the asphalt cement are very much dependent on the source of the crude oil, the mode of refinement of the crude oil, which bottom product is the asphalt or bitumen, and the type of post-treatment of the bottoms to produce paving grade asphalt.

In recent years, the quality of the asphalt material has changed and in order to meet the viscosity specifications, the emulsifier producers are forced to use either higher amounts of asphalt or an increased concentration of emulsifier. Increased amounts of emulsifier, however, changes demulsibility and set time which is not desired.

For many years, the emulsifier manufacturers and asphalt producers have been exploring ways to change the properties of the asphalt effectively in order to meet viscosity specification at the lowest specified amount of asphalt. Heretofore, no additive to the asphalt has been reported to alleviate this problem.

SUMMARY OF THE INVENTION

It has been found that by adding 0.5–10% modified tall oil pitch, the residue obtained from the distillation of crude tall oil or tall oil derived fatty acids and resin acids (rosin) to the asphalt before emulsification, emulsions will be obtained which have a higher viscosity than the emulsion prepared with the same amount of asphalt without the additive (i.e, an emulsion viscosity based on a specified bitumen content). The same emulsifier concentration was applied. Alternatively, use of the disclosed additive bituminous emulsions with reduced bitumen content can be prepared with viscosities equivalent to or higher than emulsions prepared with a greater bitumen content.

DESCRIPTION OF THE PREFERRED EMBODIMENTS

Viscosifiers for bituminous emulsions were obtained when tall oil fatty acids, rosin, tall oil pitch, petroleum derived acids or esters (aromatic acids, aliphatic acids, cycloaliphatic acids), vegetable oils, animal oils, tallow fatty acids or any distillation residue which contains carboxylic groups are reacted with:
1. ammonia or amines to form amides;
2. polyalkylene amines to form polyamides or imidazoline amides;
3. alkanolamines to form amid esters; or
4. trialkanolamines to form aminoesters These products distinguish themselves from acid-soluble emulsifiers of a similar composition in that they are not soluble in water at any pH value due to the high content of fatty acid in the condensate. Cationic emulsifiers, on the other hand, are generally prepared at a low ratio of fatty acid to polyamine.

Suitable amines to form amides (I)

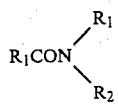     (I)

are $HNR_1R_2$, where $R_1R_2 = H-$, $CH_3-$, $CH_3(CH_2)_x-$, $C_6H_5-$, $C_6H_{11}-$ $x = 1-20$ The alkyl group can also contain one or more olefinic bonds.

The formation of imidazoline amides (II) is limited to polyethylene amines and polyamines characterized by at least one ethylene diamine functional group with at least three hydrogens attached to the two nitrogens.

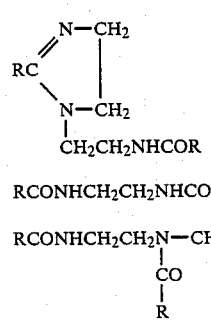    (II)

RCONHCH$_2$CH$_2$NHCOR, or    (IIIa)

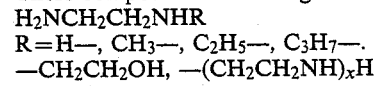    (IIIb)

Compounds of this group which are able to give both polyamidoamines (IIIa and IIIb) and imidazoline amides (II) are: ethylene diamine, diethylene triamine, triethylene tetramine, tetraethylene pentamine, pentaethylene hexamine, and higher homologues; N-aminoethyl propane diamine, N,N'-diamonoethyl propane diamine and the N-aminoethyl or N,N'-diaminoethyl substituted butane diamines, pentane diamines and hexane diamines, and N-hydroxy ethyl ethylene diamine. These compounds have the general formula:
H$_2$NCH$_2$CH$_2$NHR
$R = H-$, $CH_3-$, $C_2H_5-$, $C_3H_7-$.
$-CH_2CH_2OH$, $-(CH_2CH_2NH)_xH$
$x = 1-10$
or
$R_1R_2N(CH_2)_yNHR_3$
$R_1 = H-$, $CH_3-$, $C_2H_5-$, $C_3H_7-$, $NH_2CH_2CH_2-$.
$R_2 = H-$, $CH_3-$, $C_2H_5-$.
$R_3 = H-$, $CH_3-$, $C_2H_5-$, $C_3H_7-$, $NH_2CH_2CH_2-$.
$y = 2-10$ Amines capable of forming di- or poly-amidoamines (IIIa and IIIb) but not imidazoline amides (II) are: 1,3-diaminopropane, 1,4-diaminobutane 1,5-diaminopentane, 1,6-diaminohexane, piperazine (1,4-diazacyclohexane), N-aminoethylpiperazine, N-aminopropyl-propane diamine-1,3, N-methyl-N-aminoproplypropane diamine-1,3, N,N-diethyl propane diamine-1,3, N,N-dimethyl-ethylene diamine, N-N-dietyl ethylene diamine, N-aminohexylhexane diamine-1,6.

Suitable alkanolamines to form amidoesters (IV and V):

    (IV)

    (V)

are: 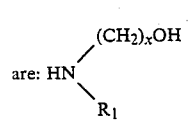

where
$R_1 = H-$, $CH_3-$, $CH_3(CH_2)_y-$, $C_6H_5-$, $C_6H_{11}-$, $-(CH_2)_zOH$
$x = 2-10$
$y = 2-20$
$z = 2-10$

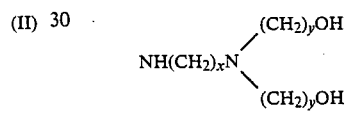

$x = 2-10$
$y = 2-10$
or $HO(CH_2)_yHN(CH_2)_xNH(CH_2)_yOH$
$y = 2-10$
$x = 2-10$

Some of these hydroxyalkylamines are also able to form imidazoline esters (VI) of the type:

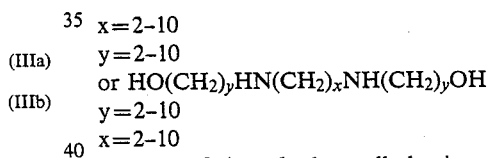    (VI)

The most common alkanolamines are derived by reaction of ammonia, primary amines, or polyamines with ethylene oxide propylene oxide, butylene oxide, styrene oxide, or cyclohexene oxide.

Amino alcohols suitable to form aminoesters (VII-XI) can be obtained by reaction of ammonia, primary, or secondary aliphatic, cycloaliphatic or aromatic amines and all the polyalkylene amines described above reacted with ethylene oxide. Similar suitable amine derivatives can be obtained by reacting ammonia and the same amines with propylene oxide, butylene oxide, styrene oxide, cyclohexene oxide, etc.

N(CH$_2$CH$_2$OCOR)$_3$    (VII)

or

-continued

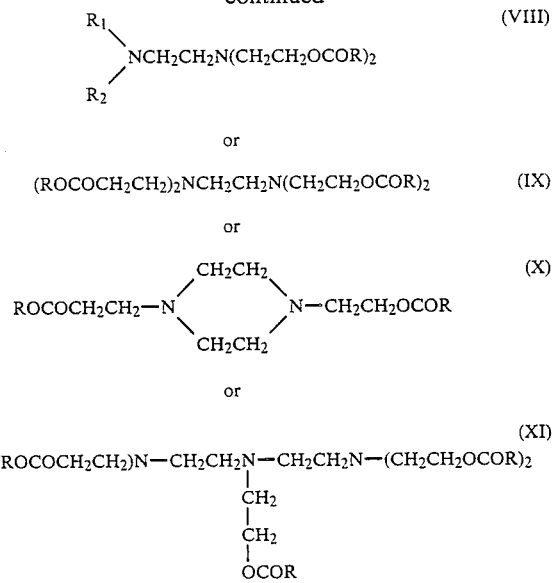

Generally, all amines or polyamines having $(CH_2)_x$— groups between nitrogen and oxygen were $x=2-10$ are suitable.

The corresponding aminoesters can be schematically depicted as (XII and XIII):

$$N[(CH_2)_xOCOR]_3 \quad (XII)$$

or $$[CH_2N(CH_2)_xOCOR]_2 \quad (XIII)$$

Improved products are obtained when the amines, polyethylene amines and hydroxyalkylamines having unsubstituted N—H bonds are pre-reacted with carbonyl compounds such as aldehydes, or polyaldehydes and ketones or polyketones:

By forming structures such as:

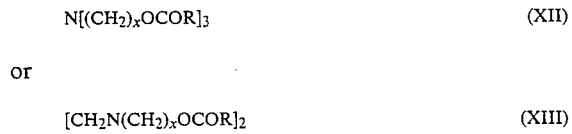

and

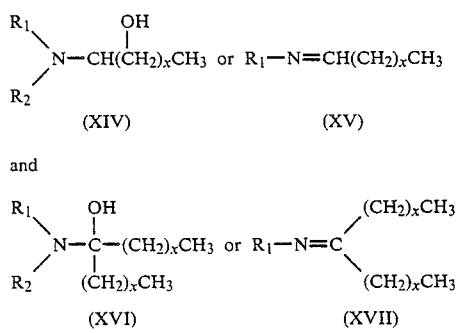

hydroxy compounds (XIV and XVI) or imines (XV and XVII) are formed which will react with carboxylic acids. Suitable aldehydes are aliphatic aldehydes with formaldehyde being the preferred reagent, aromatic aldehydes, such as benzaldehyde, polyaldehydes such as glutaraldehyde or glyoxal, unsaturated aldehydes such as acrolein or croton aldehyde.

Suitable ketones are aliphatic ketones such as acetone, methylethylketone, heptanone, cyclic ketones such as cyclohexanone, aromatic ketones such as acetophenone or benzophenone.

In most cases, the final reaction products consist of a variety of compounds. No purification or isolation is necessary to ensure good performance as asphalt emulsion viscosifier. The preferred ratio of fatty acid reactant to amine reactant is from 2:1 to 20:1. The most preferred ratio of fatty acid to amine is from 5:1 to 10:1.

The following examples show the effectiveness of emulsion viscosity improvers.

EXAMPLE 1

To 1,000 grams tall oil fatty acid (rosin, pitch, vegetable oil, petroleum derived fatty acid or esters)×grams (see Table II) of a suitable nitrogen containing compound was added at room temperature and heated to 200°-250° C. until all the condensate was collected. After cooling, in all cases where a high viscosity reaction product was obtained, a suitable hydrocarbon or aromatic solvent was added to obtain a product which was fluid at ambient temperature.

EXAMPLE 2

To 1,000 grams of the above described acids or esters, x grams of a suitable amino compound (see Table II) and y grams of a suitable aldehyde and ketone were added (see Table II) and heated to 180°-250° C. until all the condensate was collected. It was cooled and if necessary, diluted with a suitable solvent to obtain a fluid product at room temperature.

EXAMPLE 3

To show the effectiveness of the asphalt emulsion viscosity improvers in a cationic rapid set emulsion 120/150 penetration asphalt obtained from Chevron (Baltimore refinery) was emulsified with 0.2% Kenamine D-999 (Witco) at pH 2.0. The emulsions were prepared by adding 0.5–1.5% by weight of the condensate to the heated asphalt and by emulsifying this blend in the presence of the soap solution. The condensates tested and reported in the following Table II showed improvement of the viscosity of the cationic asphalt emulsions.

TABLE II

| Additive | % (Asphalt + Additive) in Emulsion | Saybolt-Furol Viscosity at 122° F. (Sec.) | % Additive in Asphalt |
|---|---|---|---|
| No | 67.3 | 57 | — |
| No | 69.2 | 480 | — |
| P-Amine HH (10:1) | 66.2 | 254 | 0.74 |
| P-TEA (10:1) | 65.3 | 157 | 0.74 |
| P-HMDA (10:1) | 65.3 | 78 | 0.74 |
| P-UREA (20:1) | 66.8 | 89 | 0.74 |
| P-Bis-APA (33:1) | 65.9 | 165 | 0.74 |
| P-D999 (10:1) | 65.8 | 138 | 0.74 |
| P-CHDA (10:1) | 65.6 | 99 | 0.74 |
| P-TEA (6:6:1) | 65.8 | 372 | 0.74 |
| P-TEA (5:1) | 65.5 | 361 | 0.74 |
| P-TETA (10:1) | 66.7 | 600 + | 0.74 |
| P-DEAM (10:1) | 65.1 | 49 | 0.74 |
| P-Aniline (10:1) | 65.1 | 51 | 0.74 |
| P-BHMT (10:1) | 66.5 | 220 | 0.74 |
| L-5 - Amine HH (6:1) | 63.8 | 102 | 0.74 |
| L-5 - TEA (5:1) | 65.9 | 124 | 0.74 |
| M28B - Amine HH (6:1) | 66.5 | 432 | 0.74 |
| M28B - TEA (5:1) | 66.4 | 171 | 0.74 |
| CTO - Amine HH (6:1) | 66.5 | 327 | 0.74 |
| CTO-TEA (5:1) | 66.4 | 148 | 0.74 |
| Liqrene D - Amine HH (5:1) | 65.6 | 280 | 0.74 |
| Liqrene D - TEA (5:1) | 65.3 | 140 | 0.74 |
| Rosin S - Amine HH (6:1) | 66.3 | 146 | 0.74 |
| Rosin S - TEA (5:1) | 66.5 | 165 | 0.74 |

TABLE II-continued

| Additive | % (Asphalt + Additive) in Emulsion | Saybolt-Furol Viscosity at 122° F. (Sec.) | % Additive in Asphalt |
|---|---|---|---|
| P - EDA (10:1) | 66.3 | 226 | 1.47 |
| P - DEA (20:1) | 66.0 | 246 | 1.47 |
| P - Amine HH (10:1) | 67.0 | 600 + | 1.47 |
| P - TEA (10:1) | 67.5 | 600 + | 1.47 |
| P - EA (20:1) | 66.4 | 264 | 1.47 |
| P - DETA (40:1) | 66.7 | 349 | 1.47 |

L-5: Tall oily fatty acid
M28B: 70% tall oil fatty acid and 30% rosin≠CTO: Crude Tall Oil
Liqrene D: Tall oil heads
TEA: Triethanolamine
HMDA: Hexamethylene diamine
Bis-APA: Bisaminopropylamine
D-999: Kenamine D-999 (fatty propane diamine)
CHDA: Cyclohexane diamine - 1.2
DEAM: Diethylamine
BHMT: Bis hexamethylene triamine bottoms (DuPont)
EDA: Ethylene diamine
DEA: Diethanolamine
EA: Ethanolamine
DETA: Diethylene triamine
TETA: Triethylene tetramine
Amine HH: Aminoethylpiperazine and triethylene tetramine

EXAMPLE 4

To show the results obtained with 120/150 penetration asphalt (from Chevron's Mobile refinery), emulsions were prepared as described in Example 3, and the results are reported in the following Table III.

TABLE III

| Additive | % (Asphalt + Additive) in Emulsion | Saybolt-Furol Viscosity at 122° F. (Sec.) | % Additive in Asphalt |
|---|---|---|---|
| Control | 65.6 | 30 | |
| Control | 67.5 | 60 | |
| Control | 70.0 | 535 | |
| Tall Oil Pitch | 67.2 | 112 | 2.2 |
| Tall Oil Pitch | 67.5 | 143 | 1.47 |
| P-TEA (1:0.15) | 67.7 | 600 + | 0.74 |
| P-TETA (1:0.1) | 66.6 | 600 + | 0.74 |
| P-HH (1:0.15) | 67.5 | 600 + | 0.73 |
| P-BL (1:0.15) | 67.5 | 600 + | 0.74 |
| P-SPL (1:0.15) | 67.4 | 600 + | 0.74 |
| P-TEA-HH (1:0.08:0.07) | 66.9 | 474 | 0.74 |
| P-TEA-TETA (1:0.08:0.07) | 67.7 | 600 + | 0.74 |
| Soybean Oil - TETA (1:0.25) | 66.1 | 191 | 0.75 |
| Soybean Oil - TEA (1:0.25) | 65.9 | 114 | 0.75 |
| Oleic Acid - TETA (1:0.267) | 65.2 | 75 | 0.75 |
| Tallow Acid - HH (1:0.167) | 65.5 | 45 | 0.75 |
| Nonionic Acid - TEA (1:0.4) | 64.4 | 40 | 0.75 |
| Benzoic Acid - DETA (1:0.25) | 64.5 | 78 | 0.75 |
| P-OCD-TEA (1:0.67:0.33) | 67.3 | 600 + | 0.75 |
| P-HEMTA (1:0.05) | 66.2 | 50 | 0.75 |
| P-HH-FA (1:0.15:0.02) | 67.1 | 510 | 0.74 |
| P-HH-Acetone (1:0.15:0.03) | 67.4 | 600 + | 0.74 |
| P-HH-CyH (1:0.15:0.1) | 67.1 | 470 | 0.74 |

P: Tall oil pitch
TEA: Triethanolamine
TETA: Triethylene tetramine
HH: Mixed polyamines (Union Carbide)
BL: Mixed polyamines (Air Products)
DETA: Diethylene triamine
SPL: Mixed polyamines (Air Products)
OCD: Tall oily fatty acid
HEMTA: Hexamethylene tetramine
FA: Formaldehyde
CyH: Cyclohexanone

EXAMPLE 5

Table IV, below, shows the viscosity improvement obtained with Edgington asphalt penetration 40/50 in a slurry seal formulation. Emulsifier: INDULIN MQK-1M, 1.8% dosage, emulsion pH value: 2.5.

TABLE IV

| Additive | % (Asphalt + Additive) in Emulsion | Saybolt-Furol Viscosity at 122° F. (Sec.) | % Additive in Asphalt |
|---|---|---|---|
| Control | 62.0 | 20 | |
| Control | 65.1 | 34 | |
| Control | 66.9 | 77 | |
| P-TEA (1:0.15) | 60.0 | 38 | 0.83 |
| P-HH (1:0.15) | 60.1 | 32 | 0.83 |
| P-HH (1:0.15) | 65.0 | 45 | 0.76 |

P: Tall oil pitch
TEA: Triethanolamine
HH: Mixed polyamines (Union Carbide)

EXAMPLE 6

Table V shows the results obtained by using the invention viscosity improvers in anionic rapid set emulsions. Asphalt: 120/150 penetration (Chevron, Mobile refinery), Emulsifier: M28B (tallow fatty acid/rosin blend), 0.3% dosage, pH value 11.5.

TABLE V

| Additive | % (Asphalt + Additive) in Emulsion | Saybolt-Furol Viscosity at 122° F. (Sec.) | % Additive in Asphalt |
|---|---|---|---|
| Control | 65.7 | 20 | |
| Control | 67.1 | 35 | |
| Control | 68.5 | 191 | |
| Tall Oil Pitch | 64.6 | 23 | 0.76 |
| Tall Oil Pitch | 65.4 | 39 | 0.51 |
| P-TEA (1:0.15) | 64.7 | 43 | 0.76 |
| P-TEA (1:0.15) | 64.7 | 69 | 1.51 |
| P-HH (1:0.15) | 65.1 | 115 | 0.76 |
| P-HH (1:0.15) | 65.1 | 120 | 1.51 |
| P-TETA (1:0.1) | 64.8 | 28 | 0.76 |
| P-TETA (1:0.1) | 65.4 | 100 | 0.51 |

P: Tall oil pitch
TEA: Triethanolamine
HH: Mixed polyamines (Union Carbide)
TETA: Triethylene tetramine While the invention has been described and illustrated herein by references to various specific materials, procedures and examples, it is understood that the invention is not restricted to the particular materials, and procedures selected for that purpose. Numerous variations of such details can be employed, as will be appreciated by those skilled in the art.

What is claimed is:

1. In a process for preparing a bituminous emulsion of a predetermined viscosity based on a specified bitumen content comprising bitumen and emulsifier in water, the improvement of producing an emulsion of reduced bitumen content characterized by a viscosity equivalent to or higher than the predetermined viscosity by adding to the bitumen material prior to emulsification with an anionic or a cationic emulsifier from 0.5 to 10% of a water-insoluble viscosifier comprising the reaction product of a first reactant selected from the group consisting of tall oil fatty acids, rosin, tall oil pitch, petroleum derived acids or esters, vegetable oils, animal oils, tallow fatty acids, and a distillation residue which contains carboxylic acid groups and a second reactant selected from the group consisting of ammonia, amine, polyalkylene amine, alkanolamine, and trialkanolamine in a ratio of from 5:1 to 10:1, respectively, and at a temperature of from 180° to 250° C.

2. The process of claim 1 wherein the second reactant is ammonia or amine and the viscosifier is an amide.

3. The process of claim 1 wherein the second reactant is polyalkylene amine and the viscosifier is a polyamide.

4. The process of claim 1 wherein the second reactant is alkanolamine and the viscosifier is an amido ester.

5. The process of claim 1 wherein the second reactant is trialkanolamine and the viscosifier is an aminoester.

6. A water-insoluble viscosifier for oil-in-water anionic and cationic bituminous emulsions comprising the reaction product of a first reactant selected from the group consisting of tall oil fatty acids, rosin, tall oil pitch, petroleum derived acids or esters, vegetable oils, animal oils, tallow fatty acids, and any distillation residue which contains carboxylic acid groups and a second reactant selected from the group consisting of ammonia, amine, polyalkylene amine, alkanolamine, and trialkanolamine in a ratio of from 5:1 to 10:1, respectively.

7. The viscosifier of claim 6 wherein the second reactant is ammonia or amine and the viscosifier is an amide.

8. The viscosifier of claim 6 wherein the second reactant is polyalkylene amine and the viscosifier is a polyamide.

9. The viscosifier of claim 6 wherein the second reactant is alkanolamine and the viscosifier is an amido ester.

10. The viscosifier of claim 6 wherein the second reactant is trialkanolamine and the viscosifier is an aminoester.

11. An improved process for preparing an oil-in-water bituminous emulsion of a predetermined viscosity based on a specified bitumen content containing, as an additive, the water-insoluble reaction product of a first reactant selected from the group consisting of tall oil fatty acids, rosin, tall oil pitch, petroleum derived acids or esters, vegetable oils, animal oils, tallow fatty acids, and a distillation residue which contains carboxylic acid groups reacted with a second reactant selected from the group consisting of ammonia, amine, polyalkylene amine, alkanolamine, and trialkanolamine wherein the improvement comprises producing an emulsion of a bitumen content lower than the specified bitumen content and characterized by a viscosity equivalent to or greater than the predetermined viscosity by adding to the bitumen material prior to emulsification with anionic or cationic emulsifier from 0.5 to 10% of the additive prepared by reacting the first reactant with the second reactant in a ratio of from 5:1 to 10:1, respectively, and at a temperature of from 180° to 250° C.

12. The improved process of claim 11 wherein the second reactant is ammonia or amine and the additive is an amide.

13. The improved process of claim 11 wherein the second reactant is polyalkylene amine and the additive is a polyamide.

14. The improved process of claim 11 wherein the second reactant is alkanolamine and the additive is an amido ester.

15. The improved process of claim 11 wherein the second reactant is trialkanolamine and the additive is an aminoester.

16. In a process for preparing an oil-in-water bituminous emulsion of a predetermined viscosity based on a specified bitumen content comprising bitumen and emulsifier, the improvement of producing an emulsion characterized by a viscosity higher than the predetermined viscosity by adding to the specified bitumen content prior to emulsification with an anionic or a cationic emulsifier from 0.5 to 10% of a water-insoluble viscosifier comprising the reaction product of a first reactant selected from the group consisting of tall oil fatty acids, rosin, tall oil pitch, petroleum derived acids or esters, vegetable oils, animal oils, tallow fatty acids, and a distillation residue which contains carboxylic acid groups and a second reactant selected from the group consisting of ammonia, amine, polyalkylene amine, alkanolamine, and trialkanolamine in a ratio of from 5:1 to 10:1, respectively, and at a temperature of from 180° to 250° C.

* * * * *

UNITED STATES PATENT AND TRADEMARK OFFICE
CERTIFICATE OF CORRECTION

PATENT NO.  : 4,859,245
DATED       : August 22, 1989
INVENTOR(S) : Peter Schilling and Hans G. Schreuders It is certified that error appears in the above-indentified patent and that said Letters Patent is hereby corrected as shown below:

In column 1, line 17, delete "fally" and substitute therefor --fatty--.

In column 2, line 27, delete "case" and substitute therefor --ease--.

In column 2, line 38, delete "alphalt" and substitute therefor --asphalt--.

In column 2, line 62, delete "quipped" and substitute therefor --equipped--.

In column 6, line 2, delete "N-N-dietyl" and substitute therefor --N-N-diethyl--.

In column 8, line 53, delete "P-UREA" and substitute therefor --P-Urea--.

In column 9, line 13, delete "*".

Signed and Sealed this

Twenty-sixth Day of October, 1993

Attest:

BRUCE LEHMAN

*Attesting Officer*     Commissioner of Patents and Trademarks